Patented Dec. 30, 1947

2,433,572

UNITED STATES PATENT OFFICE 2,433,572

CORROSION PREVENTIVE COMPOSITIONS

Paul R. McCarthy and Elliott S. Francis, Allison Park, Pa., assignors to Gulf Research & Development Company, Pittsburgh, Pa., a corporation of Delaware No Drawing. Application March 14, 1946, Serial No. 654,517

4 Claims. (Cl. 106—14)

The present invention relates to corrosion preventive compositions, and more particularly to improved protective coating compositions for metals.

Various protective coatings, for example paints, are unsuitable for application to metallic surfaces arising from the machining operations as they occur in machine shop practice. These machined surfaces are often wet with aqueous emulsions which are necessarily used in the machining operations, particularly as coolants. If such aqueous emulsions are not removed immediately, they will on standing rust iron or generally corrode any metal surfaces. Various compositions are known and have been marketed that will more or less indifferently replace this residual emulsion that clings to such machined pieces. However, they do not combine the many desirable qualities that such a composition should possess; such qualities as ease and rapidity in displacing aqueous emulsions along with an economy of material, uniformity of film coating even at the sharp edges of the coated machined piece, and effectiveness of film coating to moisture and other corrosive agents.

There is, therefore, a present need for such a metal coating composition; one which will easily and rapidly displace any aqueous emulsion clinging to the metal and simultaneously produce a uniformly thick moisture-proof film which is continuous even at the sharp edges of the coated machined piece.

It is an object of the present invention to provide a coating composition for metals so formulated as to form such a thin continuous film of protective material upon application to either a wet or even to a dry metal surface.

It is also an object of this invention to provide a corrosion preventive composition so formulated as to form a thin film of improved corrosion resistance when deposited upon a metal surface.

It is furthermore an object of this invention to provide a coating composition for metals which can be easily applied at reasonable temperatures, such as room temperature or temperatures slightly above room temperature, and which though capable of displacing aqueous emulsions can, nevertheless, be removed by the use of warm or hot water or any of the common solvents, such as for example the hydrocarbon naphthas or carbon tetrachloride.

Other objects and advantages of the invention will be apparent during the course of the following description.

Our improved corrosion preventive composition exhibits the property of being able to physically displace moisture from metal surfaces and substitute therefor an improved continuous, moisture-proof, corrosion resistant film. This protective film we have found to be capable of easy removal by the application of warm or hot water, the common hydrocarbon solvents, or the nonflammable solvents, such as carbon tetrachloride. Thus while our invention is particularly useful in its application to wet surfaces, it nevertheless can be advantageously used to coat dry metal surfaces because of the many improved qualities of the film coating formed thereupon.

We have discovered that coating compositions for metallic surfaces having the foregoing desirable characteristics may be made from an alkali salt of sulfonated degras, an alkali salt of oil-soluble petroleum sulfonic acids, and the unsaponifiable compounds obtained in the oxidation of petroleum stock. Such a composition we generally apply to metallic surfaces in admixture with a thinner or solvent, and we find that on the evaporation of the solvent, our composition produces upon the metal surfaces to which it has been applied a thin protective film of improved resistance to corrosive agents. Compositions prepared without the use of thinner produce film coatings as effective to prevent corrosion as are the thinned compositions; however they are not as easy to apply to metal surfaces and generally require heating to attain suitable fluidity and consequently are less desirable.

The sodium salt of sulfonated degras used in our invention may be prepared by treating commercial degras first with about an equal part of concentrated sulfuric acid. In lieu of commercial degras we have found that lanolin, inasmuch as lanolin is but a purified form of commercial degras, is an effective substitute. In this treatment, care should be taken to see that the temperature of reaction does not exceed 60° F. If the temperature tends to exceed 60° F., cooling means may be applied. Also, in order to keep the temperature of reaction low and easily controllable, the acid may be added in small amounts to the wool grease through a time interval of about one hour. We have found the application of stirring to the reaction mixture during the time of the acid addition to be very beneficial. This procedure allows for the dissipation of the heat of reaction before an added amount of acid is introduced into the reaction mixture. We have also found that the reaction mass should be allowed to stand for a while, preferably at least several hours, for completion of the reaction. The mixture is then poured into about twice its weight of water. To obtain the alkali salt of the sulfonated degras, solid alkali carbonate is added until the aqueous solution exhibits a distinctly alkaline reaction. The salt is then dissolved in any suitable solvent. A suitable solvent for this purpose we have found to be diethyl-ether. Evaporation of the ether leaves a residue of alkali salt of sulfonated degras in a semi-solid form ready for use in our composition.

The alkali salts of oil-soluble petroleum sulfonic acids are generally well known to the petroleum art. They are obtained by treating the more viscous petroleum stocks, such as are used in the preparation of medicinal oil, with fuming sulfuric acid. These oil-soluble petroleum sulfonic acids, more commonly called "mahogany acids," remain in the unreacted hydrocarbon oil layer. The water-soluble petroleum sulfonic acids, more commonly called "green acids," remain in the acid sludge layer. These oil-soluble petroleum sulfonic acids as produced above are subsequently recovered from the oil layer by dissolving them out by means of any suitable solvent, such as ethyl or isopropyl alcohol. Upon evaporation of the alcohol or other suitable solvent medium, the "mahogany acids" are obtained as a concentrate dissolved in a small quantity of residual hydrocarbon oil. This concentrate is treated with any desired alkali to obtain the alkali salt of the oil-soluble petroleum sulfonic acid as used herein.

In lieu of the alkali treatment subsequent to the separation of the "mahogany acids" by solvent means, the procedure wherein the "mahogany acids" are first neutralized with a desired alkali prior to the separation by solvent means, was also found to be feasible. Consequently, solvent separation processes can be used to dissolve out either the "mahogany acids" per se or their alkali salts. In either event, the oil-soluble sulfonic acids or their alkali derivatives were easily separated from a large proportion of the unreacted oil fraction in which they were previously dissolved.

The unsaponifiable oxidized petroleum products used herein are similarly generally well known to the petroleum art. They are prepared in the oxidation of petroleum stock followed by a procedure involving the subsequent removal of the undesirable saponifiable portions formed during the process of oxidation. This process of petroleum oxidation is most conveniently carried out at 100–320 pounds per square inch and at about 120–130° C. using, for example, manganese stearate or oleate as the catalyst. Time and temperature factors in this oxidation procedure are quite flexible and can be varied within suitable limits without deleteriously affecting the nature of the product. The products resulting from the oxidation procedure as outlined above consist of a variety of oxidized petroleum compounds including such undesirable compounds as the saponifiable organic acids and esters. These undesirable saponifiable compounds of the oxidation process are removed by means of hydrolysis followed by a separation of the hydrolyzed compounds. The remaining unsaponified compounds of the petroleum oxidation process are characterized as a mixture of petroleum alcohols, ketones, and ketone-alcohols. It is this product that the applicants use in their composition.

In preparing our coating composition in its preferred form, that is in solution in a solvent, the amount of alkali salt of sulfonated degras that we use may vary between about 5 and about 30 per cent of the composition weight; the amount of alkali salt of oil-soluble sulfonic acids used in our composition may vary between about 10 and about 30 per cent of the composition; while the amount of unsaponifiable oxidized petroleum stock that is used in our composition may vary between about 5 and about 35 per cent of the composition weight; and the amount of solvent used may vary between 20 and 80 per cent of the composition weight. Necessarily the total amounts of solutes used must vary between 80 and 20 per cent.

The thinner or solvent that we use in our corrosion preventive composition should have a relatively high flash point, for example, above about 100° F., and should be capable of easy volatilization under ordinary atmospheric conditions. For this purpose, we find that common naphtha and carbon tetrachloride are suitable solvents. We have found that increasing amounts of the alkali salt of sulfonated degras and the oil-soluble petroleum sulfonic acids tend to produce stiffer solutions. In the case of the high percentages, as for example when the solute amounts to about 80 per cent of the composition, it is sometimes necessary to heat the mixture to about 125° F. for it to become sufficiently fluid to be easily applicable to metal surfaces. The compositions of high solute concentration are, therefore, preferably applied to metal surfaces by brushing or dipping in lieu of spraying the warm composition. Should spraying at elevated temperatures of these compositions high in solute concentration be desirable, the use of a nonflammable solvent, such as carbon tetrachloride, is recommended because of the fire hazard.

The following composition is illustrative of our invention:

| | Parts by weight |
|---|---|
| Petroleum naphtha (flash point above 100° F.) | 60 |
| Sodium salt of sulfonated degras | 10 |
| Sodium salt of the oil-soluble petroleum sulfonic acids | 10 |
| Unsaponifiable oxidized petroleum stock | 20 |

In this composition, which is a particularly advantageous form of our invention, the solute consists of one part of alkali salt of sulfonated degras, one part of alkali salt of the oil-soluble petroleum sulfonic acids, and two parts of unsaponifiable oxidized petroleum stock. We found that the ingredient ratio of solute of 1:1:2 as outlined above is a particularly desirable ratio for maximum protection against corrosion. Compositions containing this ratio when used in the dilution above recited form films having a film thickness of about 0.005 inch under ordinary conditions of application by means of spraying. Thicker films are obtainable by applying heavier spray coatings or by recoating the previously coated articles. Generally speaking, the percentage of solute used determines the ultimate thickness of the deposited protective film on the metal surfaces. Compositions low in the amount of solute used will yield thin coatings on evaporation of the solvent, and the higher the amount of solute used, the thicker will be the deposited coating. Film thickness, therefore, is in direct ratio to the amount of solute used.

The method we used to test the resistance to corrosion of the film coatings provided by our invention involves the application of a 4 per cent solution of salt water in spray form to the specimens to be tested. The salt water spray tests were run on cold-rolled mild steel (No. 1020 Society of Automotive Engineers) rod specimens of 6 inch length and ¾ inch diameter. All tests were conducted at a temperature of 100° F. The coated test specimens were allowed to stand at this temperature in an atmosphere containing 4 per cent sodium chloride solution in dense atomized fog form until "failure," as noted by the appearance of rust specks, had occurred.

Salt water spray test data

| Composition Number | Composition in Weight Per Cent | | | | |
|---|---|---|---|---|---|
| | I | II | III | IV | V |
| Naphtha Solvent (Flash Point 100° F., End Distillation Point 410° F.) | 60 | 60 | 60 | 60 | 60 |
| Unsaponifiable oxidized petroleum stock | 5 | 10 | 15 | 20 | 20 |
| Sodium salt of the oil-soluble petroleum sulfonic acids | 10 | 10 | 10 | 10 | 5 |
| Sodium salt of sulfonated degras | 25 | 20 | 15 | 10 | 15 |
| Time to Failure in Hours, as noted by the appearance of rust specks | 547 | 908 | 908 | 4,320 | 980 |

The above data shows that the time to film "failure" and consequently to the corrosion of the steel specimens, shows a marked improvement in the case of the particularly advantageous composition as set forth in Example IV.

Water displacement tests patterned after Navy Department Specification 52C18 were performed with our compositions. These tests were run on a 400 cc. beaker scale in lieu of the larger gallon size standard scale. In this modified test, two polished mild steel (No. 1020 Society of Automotive Engineers) ¼" x 2" rods are placed horizontally in the bottom of the 400 cc. beaker, after which 100 cc. of a 4 per cent sodium chloride solution are poured into the beaker. This solution was allowed to remain forty-eight hours, whereupon 85 cc., along with any loose "soft" rust floating in the solution, were decanted. One of the two rods is then removed from the solution, washed with water and thoroughly dried. The degree of etching on this rod is noted. To the specimen rod remaining in the 15 cc. of 4 per cent sodium chloride solution, 100 cc. of corrosion preventive solution is added. The mixture of 115 cc. is vigorously stirred for one-half hour, thereby forming an emulsion. The emulsion is drained off and the remaining rod is allowed to stand in air with any residual emulsion clinging thereto for forty-eight hours. The emulsion-treated rod is then cleaned by the use of any common solvent and thoroughly dried. The degrees of etching of the two rods are compared. If the rod treated with corrosion preventive composition shows a greater degree of etching than does the sodium chloride treated rod, it is considered to have "failed" to pass the test. These tests were, therefore, of the "pass or fail" type. They resulted in the passing of samples I, II, III, and IV; sample V failed to pass this test. These tests indicate the desirability of maintaining a lower limit for the alkali salt of oil-soluble sulfonic acid of about 10 per cent. The extreme resistance to corrosion of 4,320 hours as shown by sample IV, indicates a particularly advantageous form of our invention.

Having disclosed our invention with reference to particular embodiments, we desire it to be thoroughly understood that these preferred embodiments are merely by way of illustration and in no sense are to be construed as limitations upon our invention.

What we claim as our invention is:

1. An improved corrosion preventive composition comprising, from about 5 to about 30 per cent by weight of an alkali salt of sulfonated degras, from about 10 to about 30 per cent by weight of an alkali salt of oil-soluble petroleum sulfonic acids, from about 5 to about 35 per cent by weight of unsaponifiable oxidized petroleum stock and a volatile solvent.

2. An improved corrosion preventive composition consisting of from about 1 to about 6 parts by weight of an alkali salt of sulfonated degras, from about 2 to about 6 parts by weight of an alkali salt of the oil-soluble sulfonic acids, and from about 1 to about 7 parts by weight of unsaponifiable oxidized petroleum stock.

3. An improved corrosion preventive composition comprising, about 10 per cent by weight of sodium sulfonated degras, about 10 per cent by weight of sodium salt of oil-soluble petroleum sulfonic acids, about 20 per cent by weight of unsaponifiable oxidized petroleum stock and about 60 per cent by weight of a volatile hydrocarbon solvent.

4. An improved corrosion preventive composition comprising, about 5 to about 30 per cent by weight of sodium sulfonated degras, about 10 to about 30 per cent by weight of sodium salt of oil-soluble petroleum sulfonic acids, about 5 to about 35 per cent by weight of unsaponifiable oxidized petroleum stock and about 80 to about 20 per cent by weight of a volatile hydrocarbon solvent.

PAUL R. McCARTHY.
ELLIOTT S. FRANCIS.

REFERENCES CITED

The following references are of record in the file of this patent:

UNITED STATES PATENTS

| Number | Name | Date |
|---|---|---|
| 2,383,033 | Adams et al. | Aug. 21, 1945 |
| 2,365,209 | Musselman | Dec. 19, 1944 |
| 2,184,952 | Zimmer et al. | Dec. 26, 1939 |
| 2,182,992 | Lebo | Dec. 12, 1939 |
| 2,128,523 | Burwell | Aug. 30, 1938 |
| 1,543,157 | Herzog | June 23, 1925 |

FOREIGN PATENTS

| Number | Country | Date |
|---|---|---|
| 526,960 | Great Britain | Sept. 30, 1940 |